United States Patent
Ogawa

(10) Patent No.: US 11,985,413 B2
(45) Date of Patent: May 14, 2024

(54) ELECTRONIC APPARATUS ENABLING EASY RECOGNITION OF CONTINUOUS SHOOTING TIMING, METHOD OF CONTROLLING ELECTRONIC APPARATUS, AND STORAGE MEDIUM

(71) Applicant: CANON KABUSHIKI KAISHA, Tokyo (JP)

(72) Inventor: Seiji Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/551,304

(22) Filed: Dec. 15, 2021

(65) Prior Publication Data

US 2022/0201221 A1    Jun. 23, 2022

(30) Foreign Application Priority Data

Dec. 17, 2020 (JP) .................................. 2020-209347

(51) Int. Cl.
*H04N 23/63* (2023.01)

(52) U.S. Cl.
CPC ......... *H04N 23/635* (2023.01); *H04N 23/631* (2023.01)

(58) Field of Classification Search
CPC .... H04N 23/62; H04N 23/631; H04N 23/635; H04N 23/663; H04N 23/667; H04N 23/73; H04N 23/75
See application file for complete search history.

(56) References Cited

U.S. PATENT DOCUMENTS

2017/0374288 A1* 12/2017 Kino ...................... H04N 23/71

FOREIGN PATENT DOCUMENTS

| CN | 108579028 B | * | 2/2020 | ........... A63B 33/002 |
| JP | 11-88824 A |   | 3/1999 | |

* cited by examiner

*Primary Examiner* — Antoinette T Spinks
(74) *Attorney, Agent, or Firm* — Cowan, Liebowitz & Latman, P.C.

(57) ABSTRACT

An electronic apparatus that enables a user to easily recognize continuous shooting timing. The electronic apparatus controls to light an item during performing an exposure processing, accept an instruction for performing a continuous shooting, and control not to start to light the item when the exposure processing starts before a lapse of a predetermined lighting-off period from lighting off the item last time, while accepting the instruction for performing the continuous shooting.

22 Claims, 8 Drawing Sheets

ELECTRONIC APPARATUS ENABLING EASY RECOGNITION OF CONTINUOUS SHOOTING TIMING, METHOD OF CONTROLLING ELECTRONIC APPARATUS, AND STORAGE MEDIUM

BACKGROUND OF THE INVENTION

Field of the Invention

The present invention relates to an electronic apparatus that enables easy recognition of continuous shooting timing, a method of controlling the electronic apparatus, and a storage medium.

Description of the Related Art

Shooting using an electronic shutter produces no shutter sound since a mechanical shutter is not driven, and hence it is sometimes impossible to recognize the shooting timing. Japanese Laid-Open Patent Publication (Kokai) No. H11-88824 discloses a technique for expressing, when shooting is being performed in a continuous shooting mode, a continuous shooting speed by blinking the display indicating the continuous shooting mode at a period set according to the continuous shooting speed.

However, the technique disclosed in Japanese Laid-Open Patent Publication (Kokai) No. H11-88824 has a problem that a user cannot recognize the continuous shooting timing.

SUMMARY OF THE INVENTION

The present invention provides an electronic apparatus that enables a user to easily recognize continuous shooting timing, a method of controlling the electronic apparatus, and a storage medium.

In a first aspect of the present invention, there is provided an electronic apparatus, including a processor; and a memory storing a program which, when executed by the processor, causes the electronic apparatus to: control to light an item during performing an exposure processing, accept an instruction for performing a continuous shooting, and control not to start to light the item when the exposure processing starts before a lapse of a predetermined lighting-off period from lighting off the item last time, while accepting the instruction for performing the continuous shooting.

In a second aspect of the present invention, there is provided a method of controlling an electronic apparatus, including controlling to light an item during performing an exposure processing, accepting an instruction for performing a continuous shooting, and controlling not to start to light the item when the exposure processing starts before a lapse of a predetermined lighting-off period from lighting off the item last time, while accepting the instruction for performing the continuous shooting.

According to the present invention, a user is enabled to easily recognize the continuous shooting timing.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. Although in the present embodiment, the description will be given of a case where the present invention is applied to a digital camera as an electronic apparatus, the present invention is not limitatively applied to the digital camera. For example, the present invention may be applied to an apparatus equipped with a continuous shooting function for performing continuous shooting based on a shutter speed and a frame speed that are set by a user to selected ones of a plurality of choices.

Figure 1A:
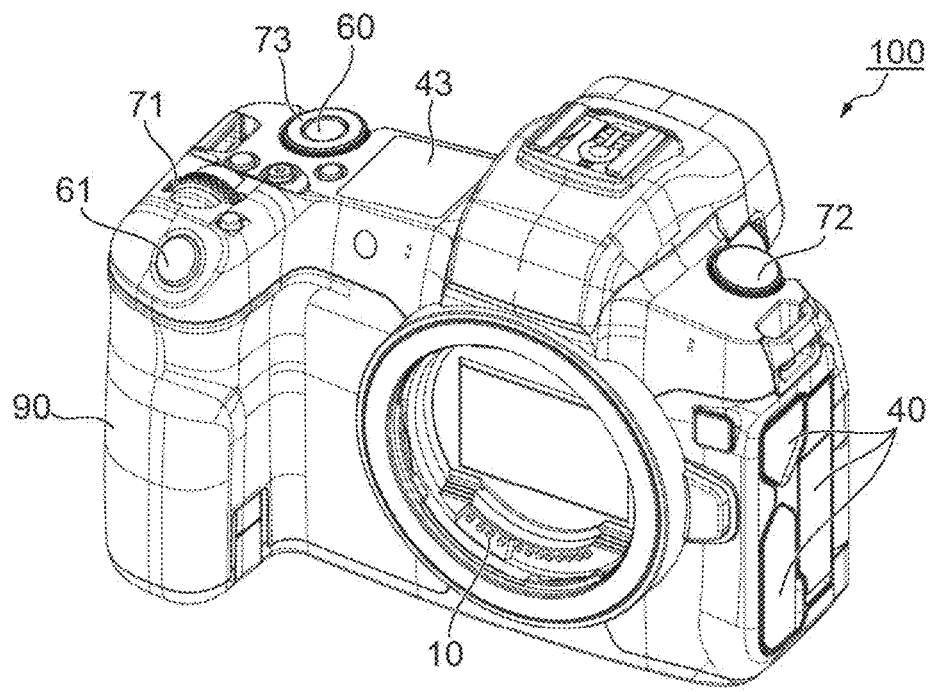
FIGS. 1A and 1B are views of the appearance of a digital camera as an electronic apparatus according to an embodiment of the present invention.
Figure 1B:
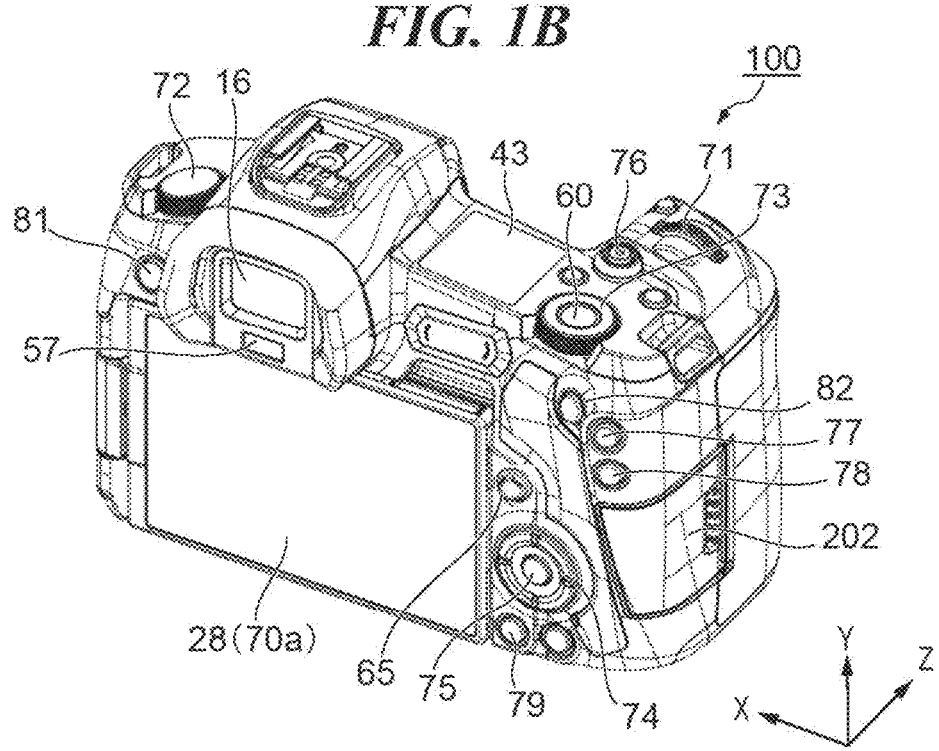

FIGS. 1A and 1B are views of the appearance of a digital camera 100 as the electronic apparatus according to an embodiment of the present invention. The digital camera 100 is capable of operating in a drive mode (continuous shooting mode) in which continuous shooting is executed while an operation member for instructing the start of shooting is being pressed. The number of images to be continuously shot per unit time in the drive mode can be set by a user. The number of images to be continuously shot per unit time in the drive mode is referred to as the frame speed or the continuous shooting speed. In the present embodiment, as the frame speed, one of 3 frames (low speed), 10 frames (normal speed), and 30 frames (high speed) can be selected. Note that the frame speed may be selectable from more candidates, or may be continuously settable by using a slider or the like.

Further, in the digital camera 100, an exposure time can be set as a shooting parameter. The exposure time is expressed as a shutter speed (Tv). As the shutter speed, one of a low-speed setting, such as $1/5$ seconds, $1/30$ seconds, and $1/60$ seconds, a high-speed setting, such as $1/2000$ seconds and $1/8000$ seconds, and a long shutter, such as 10 seconds, can be set. Further, it is also possible to automatically set the shutter speed (perform the automatic exposure (AE) processing) according to a brightness of a subject for shooting, which is acquired in a shooting preparation state.

The digital camera 100 displays an item for use in causing a user to recognize the shooting timing while continuous shooting is being executed in the drive mode. Further, the digital camera 100 has a characteristic configuration that the digital camera 100 displays the above-mentioned item at the timing of execution of shooting. This enables a user to easily recognize the timing of execution of shooting during continuous shooting.

The digital camera 100 displays the item at the timing of execution of shooting for a time period associated with the exposure time. This enables a user not only to easily recognize the timing of execution of shooting during continuous shooting, but also to easily recognize the length of the exposure time.

In a case where the exposure time is shorter than a predetermined threshold value, the digital camera 100 displays the item for a predetermined lighting-on period (minimum lighting-on period) regardless of the exposure time. This enables a user to easily recognize the timing of execution of shooting during continuous shooting even when the exposure time is set to be short (the shutter speed is set to a high speed).

Further, the digital camera 100 controls the display such that a next display of the item is not started at least before a predetermined lighting-off period (minimum lighting-off period) elapses after the display of the item is completed. This makes it possible to prevent a user from erroneously recognizing that the exposure time is longer than the set exposure time due to a too short display interval of the item.

In the following, the control of the digital camera 100 will be described in detail.

FIG. 1A is a front perspective view of the digital camera 100. FIG. 1B is a rear perspective view of the digital camera 100.

A display section 28 is provided on the rear side of the digital camera 100 and displays an image and various information. A touch panel 70a can detect a touch operation performed on a display surface of the display section 28. An ex-finder display section 43 is provided on the top side of the digital camera 100 and displays various settings of the digital camera 100, such as a shutter speed and an aperture value. A shutter button 61 is an operation member for giving a shooting instruction (image capturing instruction). A mode switching switch 60 is an operation member for switching between various modes. Terminal covers 40 are covers for protecting connectors (not shown) for connecting the digital camera 100 to external devices.

A main electronic dial 71 is a rotation operation member, and settings, such as a shutter speed and an aperture value, can be changed by rotating the main electronic dial 71. A power switch 72 is an operation member for switching between on and off of power supply of the digital camera 100. A sub electronic dial 73 is a rotation operation member, and by rotating the sub electronic dial 73, it is possible to perform operations including movement of a selection frame (cursor), feed of an image, and so forth. A four-direction key 74 is configured such that upper, lower, left, and right portions thereof can be pushed in, to thereby causing execution of processing associated with the pushed portion of the four-direction key 74. A SET button 75 is a push button and is mainly used e.g. for determining selection of an item. A multi-controller (hereinafter referred to as the MC) 65 can receive direction-instructing operations for eight directions and an operation of pushing in a central portion thereof.

A moving image button 76 is used for instructing the start and stop of moving image shooting (recording). An AE lock button 77 is a push button, and the exposure state can be fixed by pressing the AE lock button 77 in a shooting standby state. An enlarging button 78 is an operation button for switching on and off of an enlargement mode on the live view display (LV display) in a shooting mode. When the main electronic dial 71 is operated after the enlargement mode is set to on, the live view image (LV image) can be enlarged or reduced. In a reproduction mode, the enlarging button 78 functions as an operation button for enlarging a reproduced image or increasing the magnification rate of the image. A reproduction button 79 is an operation button for switching between the shooting mode and the reproduction mode. When the reproduction button 79 is pressed during the shooting mode, it is possible to shift the shooting mode to the reproduction mode and display a latest image out of images recorded in a recording medium 200 (referred to hereinafter), on the display section 28. A menu button 81 is a push button used for instructing the display of a menu screen, and when the menu button 81 is pressed, the menu screen on which various settings can be made is displayed on the display section 28. A user can intuitively make various settings, using the menu screen displayed on the display section 28, and by operating the four-direction key 74, the SET button 75, or the MC 65. A line-of-sight determination button 82 is an operation member included in an operation section 70 (referred to hereinafter) and is a push button for instructing selection or deselection of a subject for shooting based on a position of a user's line of sight within a viewfinder screen, which is detected by a line-of-sight detection sensor 164, referred to hereinafter. The line-of-sight determination button 82 is disposed at a location easily operable by a user even in a state in which the user looks in a viewfinder (state in which a user's eye is in contact with an eyepiece 16), which is a location operable by the user with the thumb of the user's right hand holding a grip portion 90.

A communication terminal 10 is used by the digital camera 100 so as to communication with a lens unit 150 (described hereinafter, and removable). The eyepiece 16 is a portion of an eyepiece viewfinder (look-in type viewfinder), and a user can visually recognize a video displayed on an internal electronic viewfinder (EVF) 29 through the eyepiece 16. Note that the eyepiece viewfinder is formed by the eyepiece 16, a line-of-sight detection section 160, described hereinafter, and the EVF 29. An eye-contact detection section 57 is an eye-contact detection sensor for detecting whether or not an eye of a user (photographer) is in contact. A cover 202 is a cover for a slot that accommodates the recording medium 200 (described hereinafter). The grip portion 90 is a holding portion shaped such that the grip portion 90 can be easily grasped with a right hand when a user holds the digital camera 100. The shutter button 61 and the main electronic dial 71 are arranged at respective locations operable with the forefinger of the right hand in a state holding the digital camera 100 by grasping the grip portion 90 with the little, ring, and middle fingers of the right hand. Further, the sub electronic dial 73 and the line-of-sight determination button 82 are arranged at respective locations operable with the thumb of the right hand in the same state.

Figure 2:
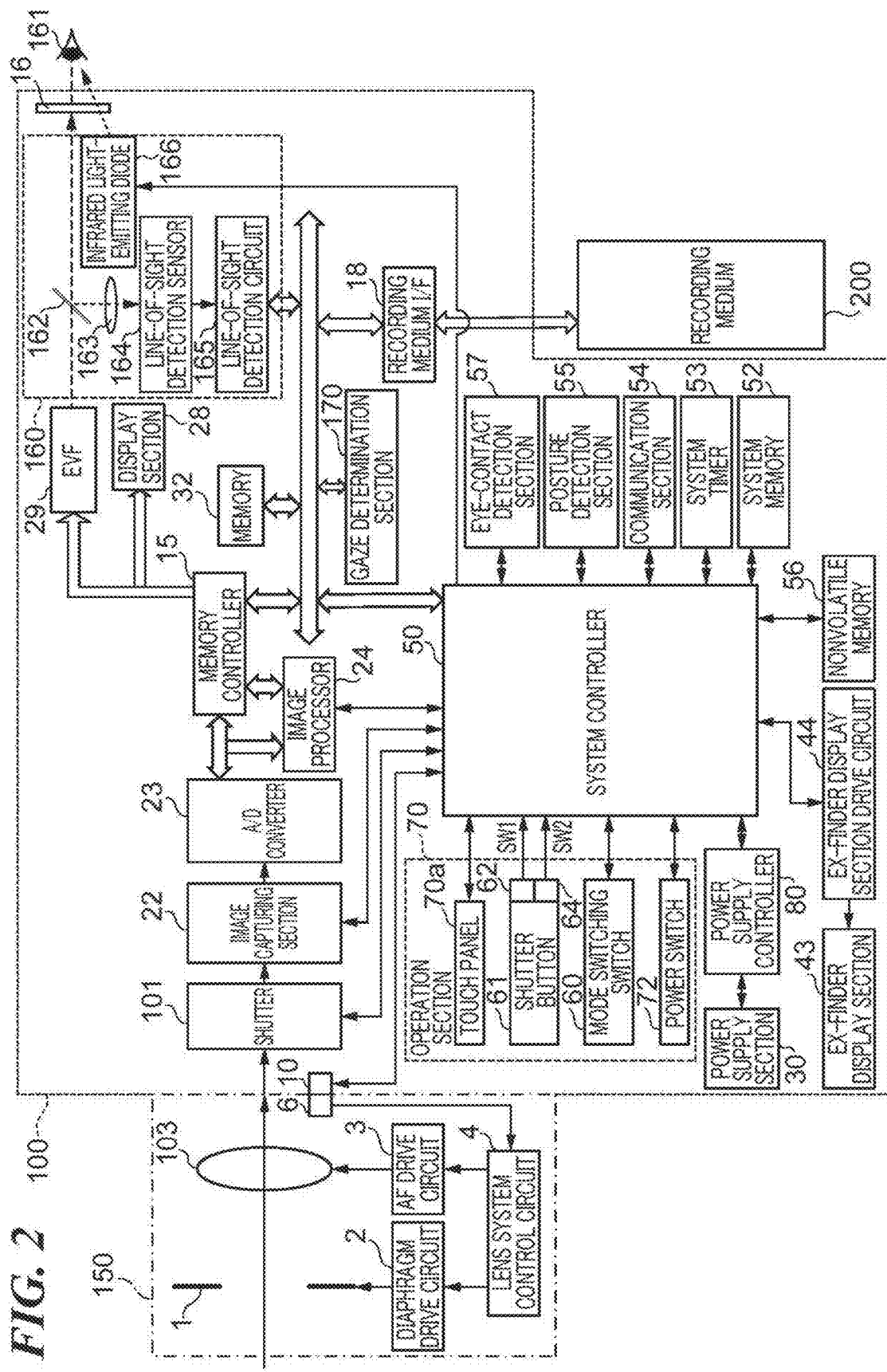
FIG. 2 is a block diagram showing an example of the configuration of the digital camera.

FIG. 2 is a block diagram showing an example of the configuration of the digital camera 100 shown in FIGS. 1A and 1B. The lens unit 150 is a lens unit on which an interchangeable photographic lens is mounted. Although a lens 103 is generally formed by a plurality of lenses, in FIG. 2, the lens 103 is illustrated as only one lens for simplification. A communication terminal 6 is used by the lens unit 150 so as to communication with the digital camera 100, and the communication terminal 10 is used by the digital camera 100 so as to communication with the lens unit 150. The lens unit 150 communicates with a system controller 50 via these communication terminals 6 and 10. Further, the lens unit 150 includes a lens system control circuit 4 that controls a diaphragm 1 via a diaphragm drive circuit 2. Further, the lens system control circuit 4 of the lens unit 150 causes displacement of the lens 103 via an AF drive circuit 3 to thereby perform focusing.

A shutter 101 is a focal plane shutter capable of freely controlling the exposure time of an image capturing section 22 under the control of the system controller 50.

The image capturing section 22 is an image capturing device implemented by a CCD or CMOS device that converts an optical image to electrical signals. The image capturing section 22 may have an imaging plane phase difference sensor that outputs defocus amount information to the system controller 50.

An image processor 24 performs predetermined processing (pixel interpolation, resizing, such as size reduction, color conversion, and so forth) on data output from an analog-to-digital converter 23 or data output from a memory controller 15. Further, the image processor 24 performs predetermined computation processing on captured image data, and the system controller 50 performs exposure control and ranging control based on results of the computation by the image processor 24. With these controls, auto-focus (AF) processing of a trough-the-lens (TTL) method, automatic exposure (AE) processing, electronic flash pre-emission (EF) processing, and so forth are performed. The image processor 24 further performs predetermined computation processing on captured image data, and performs automatic white balance (AWB) processing of the TTL method, based on obtained results of the computation.

The memory controller 15 controls transmission/reception of data between the analog-to-digital converter 23, the image processor 24, and a memory 32. Data output from the analog-to-digital converter 23 is written into the memory 32 via the image processor 24 and the memory controller 15. Alternatively, data output from the analog-to-digital converter 23 is written into the memory 32 via the memory controller 15 without via the image processor 24. The memory 32 stores image data captured by the image capturing section 22 and converted to digital data by the analog-to-digital converter 23 and image data to be displayed on the display section 28 or the EVF 29. The memory 32 has a sufficient storage capacity to store a predetermined number of still images and a predetermined duration of moving image and sound.

Further, the memory 32 also functions as a memory for image display (video memory). Image data for display written in the memory 32 is displayed on the display section 28 or the EVF 29 via the memory controller 15. The display section 28 and the EVF 29 each perform the display on a display device, such as an LCD or an organic EL, according to signals delivered from the memory controller 15. Data converted from analog to digital by the analog-to-digital converter 23 and accumulated in the memory 32 is sequentially transferred to the display section 28 or the EVF 29 so as to be displayed thereon, whereby a live view display (LV) is performed. An image displayed by the live view display is hereinafter referred to as the live view image (LV image).

The line-of-sight detection section 160 detects a line of sight of a user's eye which is in contact with the eyepiece 16 and views the EVF 29. The line-of-sight detection section 160 is formed by a dichroic mirror 162, an image forming lens 163, the line-of-sight detection sensor 164, a line-of-sight detection circuit 165, and an infrared light-emitting diode 166.

The infrared light-emitting diode 166 is a light emitting element used for detecting the position of a user's line of sight within the viewfinder screen and irradiates an eyeball (eye) 161 of a user with infrared light. The infrared light emitted from the infrared light-emitting diode 166 is reflected by the eyeball (eye) 161, and the reflected infrared light reaches the dichroic mirror 162. The dichroic mirror 162 reflects only infrared light and allows visible light to pass therethrough. The reflected infrared light whose optical path has been changed forms an image on an imaging surface of the line-of-sight detection sensor 164 via the image forming lens 163. The image forming lens 163 is an optical member which is a component of a line-of-sight detection optical system. The line-of-sight detection sensor 164 is implemented by an image capturing device, such as a CCD image sensor.

The line-of-sight detection sensor 164 photoelectrically convers the incident reflected infrared light to electrical signals and outputs the electrical signals to the line-of-sight detection circuit 165. The line-of-sight detection circuit 165 detects a position of the line of sight of the user from movement of the user's eyeball (eye) 161 based on the signals output from the line-of-sight detection sensor 164 and outputs the detection information to the system controller 50 and a gaze determination section 170.

Based on detection information received from the line-of-sight detection circuit 165, the gaze determination section 170 determines, in a case where a time period in which the user's line of sight is fixed to one area exceeds a predetermined threshold value, that the user gazes the one area. Therefore, it can be said that the one area is a gazed position (gazed area) where the user has gazed. Note that the state in which "the line of sight is fixed to one area" refers e.g. to a state in which, until the lapse of a predetermined time period, an averaged position of movement of the line of sight is within the one area and the movement has variation (dispersion) less than a predetermined value. Note that the predetermined threshold value can be changed as desired by the system controller 50. Further, instead of providing the gaze determination section 170 as an independent block, the system controller 50 may execute the same function as the gaze determination section 170 based on the detection information received from the line-of-sight detection circuit 165.

In the present embodiment, the line-of-sight detection section 160 detects a line of sight by a method called the corneal reflection method. The corneal reflection method is a method of detecting a direction and a position of the line of sight, based on a positional relationship between the reflected light of infrared light emitted from the infrared light-emitting diode 166 and reflected by the eyeball (eye) 161 (particularly, a cornea), and the pupil of the eyeball (eye) 161. Note that the method of detecting the line of sight (the direction and position of the line of sight) is not particularly limited, but any other suitable method may be employed. For example, a method called the sclera reflection method may be used which makes use of a difference in light reflectance between a black portion and a white portion of an eye.

The ex-finder display section 43 displays various settings of the camera, such as a shutter speed and an aperture value, via an ex-finder display section drive circuit 44.

A nonvolatile memory 56 is an electrically erasable and recordable memory and is implemented e.g. by a Flash-ROM. The nonvolatile memory 56 records constants, programs, and so forth, for the operation of the system controller 50. The programs mentioned here refer to programs for executing various processes, described hereinafter, in the present embodiment.

The system controller 50 is a controller implemented by at least one processor or circuit and controls the overall operation of the digital camera 100. The system controller 50 realizes processes of the present embodiment, described hereinafter, by executing the programs recorded in the above-mentioned nonvolatile memory 56. A system memory 52 is e.g. a RAM, and the system controller 50 loads the constants, the variables, and the programs read from the nonvolatile memory 56 into the system memory 52, for the operation of the system controller 50. Further, the system controller 50 performs display control by controlling the memory 32, the display section 28, and so forth.

A system timer 53 is a time measurement section for measuring a time used for various controls and a time of a built-in clock.

A power supply controller 80 is formed by a battery detection circuit, a DC-DC converter, a switch circuit for switching blocks to be energized, and so forth, and detects whether or not a battery is attached, a type of the battery, a remaining charge of the battery, and so forth. Further, the power supply controller 80 controls the DC-DC converter based on results of the above-mentioned detection and an instruction from the system controller 50 to supply a required voltage to each of components including the recording medium 200 for a required time period. A power supply section 30 is comprised of a primary battery, such as an alkaline battery or a lithium battery, or a secondary battery, such as a NiCd battery, a NiMH battery, or an Li battery, and an AC adapter.

A recording medium interface 18 is an interface with the recording medium 200, such as a memory card or a hard disk. The recording medium 200 is a recording medium, such as a memory card, for recording a shot image, and is implemented by a semiconductor memory, a magnetic disk, or the like.

A communication section 54 transmits and receives a video signal and an audio signal to and from an external device connected wirelessly or by a wired cable. The communication section 54 can be connected to a wireless Local Area Network (LAN) and the Internet. Further, the communication section 54 can communicate with an external device using Bluetooth (registered trademark) or Bluetooth Low Energy. The communication section 54 is capable of transmitting an image shot by the image capturing section 22 (including an LV image) and an image recorded in the recording medium 200 and receiving image data and other various information from an external device.

A posture detection section 55 detects a posture of the digital camera 100 with respect to the gravity direction. Whether an image shot by the image capturing section 22 is an image shot when the digital camera 100 is held horizontally or an image shot when the digital camera 100 is held vertically can be determined based on a posture detected by the posture detection section 55. The system controller 50 can add direction information dependent on a posture detected by the posture detection section 55 to an image file of an image captured by the image capturing section 22 and record an image after rotating the same. As the posture detection section 55, an acceleration sensor, a gyro sensor, or the like can be used. It is also possible to detect movement of the digital camera 100 (whether the digital camera 100 is panned, tilted, lifted, or still) using the acceleration sensor or the gyro sensor as the posture detection section 55.

The eye-contact detection section 57 is an eye-contact detection sensor that detects approach of the eye (object) 161 to the the eyepiece 16 of the eyepiece finder (hereinafter simply referred to as the "viewfinder") (eye-contacted state) and separation of the eye (object) 161 from the eyepiece 16 (eye-removed state) (approach detection). The system controller 50 switches display (display state)/non-display (non-display state) of the display section 28 and the EVF 29 according to a state detected by the eye-contact detection section 57. More specifically, in a case where the digital camera 100 is at least in the shooting standby state and the switching of a display destination is set to automatic switching, when a user's eye is not in contact with the eyepiece 16, the display destination is set to the display section 28 and the display thereof is turned on, whereas the EVF 29 is set to the non-display state. On the other hand, when a user's eye is in contact with the eyepiece 16, the display destination is set to the EVF 29 and the display thereof is turned on, whereas the display section 28 is set to the non-display state. As the eye-contact detection section 57, an infrared proximity sensor, for example, can be used, and the infrared proximity sensor can detect proximity of any object to the eyepiece 16 of the viewfinder incorporating the EVF 29. If an object approaches, infrared light emitted from a light projection section (not shown) of the eye-contact detection section 57 is reflected by the object and received by a light reception section (not shown) of the infrared proximity sensor. A distance from the approaching object to the eyepiece 16 (eye approaching distance) can also be determined based on an amount of received infrared light. Thus, the eye-contact detection section 57 performs eye-contact detection for detecting an approaching distance from an object to the eyepiece 16. Note that in a case where an object approaching within a predetermined distance from the eyepiece 16 is detected from the non-eye-contacted state (non-proximity state), it is determined that the object is in contact with the eyepiece 16. In a case where an object which has been detected as the approaching object moves more than a predetermined distance away from the eye-contacted state (proximity state), it is determined that the object has been removed from the eyepiece 16. The threshold value for detecting contact of an eye and the threshold value for detecting removal of an eye may be made different e.g. by setting a hysteresis. Further, after contact of an eye is detected, it is assumed that the eye-contacted state continues until removal of the eye is detected. After removal of the eye is detected, it is assumed that the non-eye-contacted state continues until contact of an eye is detected. Note that the infrared proximity sensor is described by way of example, but any other suitable sensor may be employed for the eye-contact detection section 57 insofar as it is a sensor capable of detecting proximity of an eye or an object, which can be regarded as eye-contacted.

The system controller 50 can detect the following states of a line of sight with respect to the EVF 29 by controlling the line-of-sight detection section 160: a state in which a line of sight which has not been directed to the EVF 29 is newly directed to the EVF 29, i.e. the start of an input of the line of sight; a state in which the line of sight is being input to the EVF 29; a state in which the user is gazing at one position in the EVF 29; a state in which the line of sight directed to the EVF 29 is removed, i.e. the end of the input of the line of sight; and a state in which no line of sight is being input to the EVF 29 (state in which the user does not view the EVF 29).

These operations/states and the position (direction) of the line of sight directed to the EVF 29 are notified to the system controller 50 via an internal bus, and the system controller 50 determines how a line of sight is being input based on the notified information.

The operation section 70 is an input section that receives an operation from a user (user operation) and is used to input various operation instructions to the system controller 50. As shown in FIG. 2, the operation section 70 includes the mode switching switch 60, the shutter button 61, the power switch 72, and the touch panel 70a. Further, the operation section 70 includes the main electronic dial 71, the sub electronic dial 73, the four-direction key 74, the SET button 75, the moving image button 76, the AE lock button 77, the enlarging button 78, the reproduction button 79, the menu button 81, the MC 65, and so forth.

The mode switching switch 60 is used to switch the operation mode of the system controller 50 to one of a still image-shooting mode, a moving image-shooting mode, the reproduction mode, and so forth. Examples of modes included in the still image shooting mode include an auto shooting mode, an auto scene determination mode, a manual mode, an aperture priority mode (Av mode), a shutter speed priority mode (Tv mode), and a program AE mode (P mode). Further, there are various scene modes in which different shooting settings are set for respective shooting scenes, a custom mode, and so forth. A user can directly switch the mode to one of these modes by using the mode switching switch 60. Alternatively, after once switching the screen to a screen of a shooting mode list by using the mode switching switch 60, the user may selectively switch the mode to one of the plurality of modes displayed on the list by using another operation member. Similarly, a plurality of modes may be included in the moving image-shooting mode.

The shutter button 61 includes a first shutter switch 62 and a second shutter switch 64. The first shutter switch 62 is turned on by a halfway operation, i.e. so-called half depression (shooting preparation instruction) of the shutter button 61 to generate a first shutter switch signal SW1. In response to the first shutter switch signal SW1, the system controller 50 starts shooting preparation operations, such as the auto focus (AF) processing, the auto exposure (AE) processing, the auto white balance (AWB) processing, and the flash preliminary light emission (EF) processing. The second shutter switch 64 is turned on by a complete operation, i.e. so-called full depression (shooting instruction) of the shutter button 61 to generate a second shutter switch signal SW2. In response to the second shutter switch signal SW2, the system controller 50 starts a sequence of shooting processing operations from reading of signals from the image capturing section 22 to writing of a shot image into the recording medium 200 as an image file.

The touch panel 70a and the display section 28 can be integrally formed. For example, the touch panel 70a is configured such that the light transmittance thereof does not block the display section 28 from displaying and is attached to the top layer of the display surface of the display section 28. Further, input coordinates on the touch panel 70a and display coordinates on the display surface of the display section 28 are associated with each other. With this, it is possible to provide a graphical user interface (GUI) enabling a user to perform an operation as if the user directly operates the screen displayed on the display section 28.

The system controller 50 can detect the following operations performed on the touch panel 70a and the following states of the same: an operation of newly touching the touch panel 70a with a finger or a pen which has not been touching the touch panel 70a, i.e. the start of a touch (hereinafter referred to as a touch-down); a state in which the touch panel 70a is being touched with the finger or the pen (hereinafter referred to as a touch-on); a state in which the finger or the pen is moving while touching the touch panel 70a (hereinafter referred to as a touch-move); an operation of removing (releasing) the finger or the pen which has been touching the touch panel 70a, i.e. the end of a touch (hereinafter referred to as a touch-up); and a state in which nothing is touching the touch panel 70a (hereinafter referred to as a touch-off).

When a touch-down is detected, a touch-on is detected at the same time. After the touch-down is detected, usually, the touch-on is continuously detected unless a touch-up is detected. In a case where a touch-move is detected, the touch-on is also detected at the same time. Even when the touch-on is detected, unless the touched position is moved, a touch-move is not detected. When a touch-up of all fingers or a pen which have/has been touching the touch panel 70a is detected and thereafter, the touch panel 70a is in the state of the touch-off.

A detected one of operations and states and coordinates of a position on the touch panel 70a where a finger or a pen is touching are notified to the system controller 50 via the internal bus. Then, the system controller 50 determines what operation (touch operation) has been performed on the touch panel 70a based on the notified information. When a touch-move is detected, a moving direction in which the finger or the pen is moving on the touch panel 70a can also be determined with respect to each of vertical and horizontal components of the movement on the touch panel 70a based on changes of the position coordinates. In a case where a touch-move over a predetermined distance or more is detected, it is determined that a slide operation has been performed. An operation of quickly moving the finger or the pen over a certain distance while keeping the finger or the pen in contact with the touch panel 70a and then directly moving the finger or the pen off the same is referred to as a flick. In other words, the flick is an operation of quickly moving a finger or a pen on the touch panel 70a as if flicking the finger or the pen against the touch panel 70a. When a touch-move at a predetermined speed or higher over a predetermined distance or more has been detected and then directly a touch-up is detected, it is possible to determine that a flick has been performed (it is possible to determine that a flick has been performed after a slide operation). Further, a touch operation of touching a plurality of points (e.g. two points) at the same time (multi-touch) and moving the touched positions closer to each other is referred to as a pinch-in, and a touch operation of moving the touched positions away from each other is referred to as a pinch-out. The pinch-out and the pinch-in are collectively referred to as the pinch operation (or simply referred to as the pinch). As the touch panel 70a, there may be employed a touch panel of any suitable one of various types, including a resistance film type, a capacitance type, a surface acoustic wave type, an infrared ray type, an electromagnetic induction type, an image recognition type, and an optical sensor type. Although the touch panel types include a type that detects a touch when a contact with the touch panel is detected and a type that detects a touch when proximity of a finger or a pen to the touch panel is detected, either type can be employed.

Note that the digital camera 100 may be provided with an audio input section (not shown) that transmits audio signals obtained from a built-in microphone or an audio input device connected via an audio input terminal, to the system controller 50. In this case, the system controller 50 selects input audio signals as required, converts the selected input audio signals from analog to digital, and performs processing for making the signal level appropriate, processing for reducing specific frequencies, and so forth.

In the present embodiment, the user can set a method of designating a position index (e.g. the position of an AF frame) in a case where a touch-move operation is performed in an eye-contacted state to one of an absolute position designation method and a relative position designation method. The absolute position designation method refers to a method in which input coordinates on the touch panel 70a and display coordinates on the display surface of the EVF 29 are associated with each other. In the case of the absolute position designation method, when a touch-down on the touch panel 70a is detected, the AF frame is set to a position associated with the touched position (position where the coordinates thereof are input) (i.e. the AF frame is moved from a position before detecting the touch-down) even when no touch-move is detected. The position set by the absolute position designation method is a position based on the touched-down position regardless of the position set before the touch-down. Further, when a touch-move is detected after the touch-down, the position of the AF frame is also moved based on the touched position after the touch-move. The relative position designation method refers to a method in which input coordinates on the touch panel 70a and display coordinates on the display surface of the EVF 29 are not associated with each other. In the case of the relative position designation method, in a state in which only a touch-down on the touch panel 70a is detected, but a touch-move is not detected, the position of the AF frame is not moved from a position before the touch-down. When a touch-move is detected after that, the position of the AF frame is moved from the currently set position of the AF frame (position set before the touch-down) by a distance corresponding to the movement amount of the touch-move in a direction of movement of the touch-move regardless of the touched-down position.

Note that the user can set one of a plurality of AF methods including "one point AF" and "entire area AF" as an AF area setting (AF frame-setting method). Further, the user can set whether or not to perform subject detection (tracking). The "one point AF" refers to a method in which a user designates one point as a position to perform AF using a one point AF frame. The "entire area AF" refers to a method in which in a case where a user does not designate a subject to be tracked, the AF position is automatically set based on an automatic selection condition. The tracking setting can be reflected on each of these AF area settings in a multiplied manner, and in a case where the tracking setting is set to be enabled, a mode is set in which a face is preferentially selected as an AF target subject if a face of a person is detected from an LV image. In a case where a plurality of faces are detected, one of the faces is selected to be set as the AF target subject according to priorities including a face having a large size, a face positioned close to the digital camera 100 (on the very near side), a face positioned close to the center within the screen, and a face of an individual registered in advance. If a face of a person is not detected, a subject other than a face is selected and set as the AF target subject according to priorities including a subject positioned close to the digital camera 100 (on the very near side), a subject having high contrast, a subject having high priority, such as an animal and a vehicle, and a moving body. In a case where a subject to be tracked is designated by a user, the subject to be tracked is set as the AF target subject. That is, the automatic selection condition is that by performing weighting using at least one of element conditions, enumerated below by way of example, an obtained score is not lower than a predetermined threshold value or is the highest. The element conditions are as follows: a face of a detected person; a face having a large size; a face positioned close to the digital camera 100 (on the near side); a face positioned close to the center within the screen; a face of an individual registered in advance; a subject positioned close to the digital camera 100 (on the very near side); a subject having high contrast; a subject having high priority, such as an animal and a vehicle; and a moving body.

Figure 3:
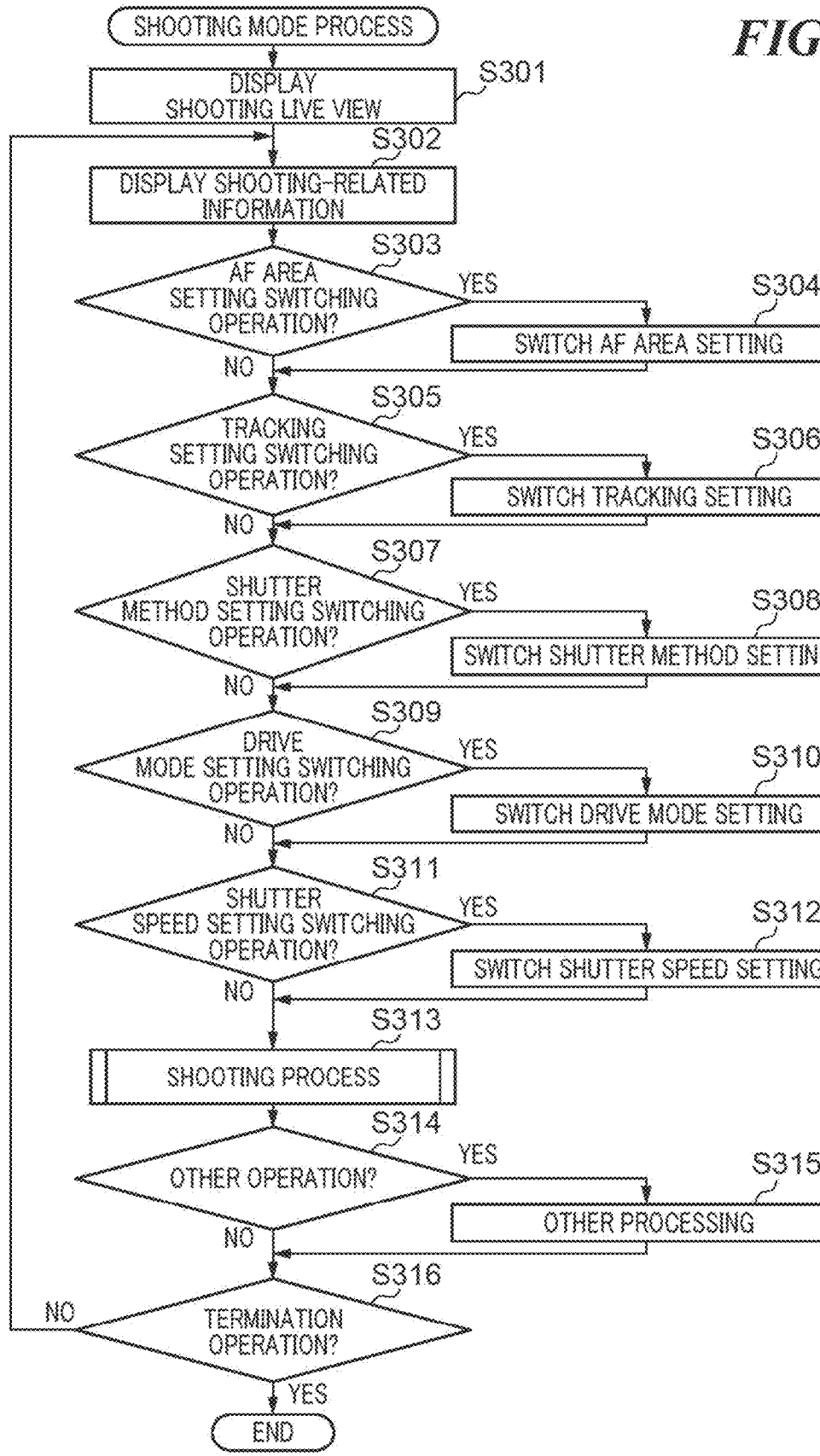
FIG. 3 is a flowchart of a shooting mode process performed by the digital camera.

FIG. 3 is a flowchart of a shooting mode process performed by the digital camera 100 shown in FIGS. 1A and 1B. The shooting mode process in FIG. 3 is realized by the system controller 50 that loads a program stored in the nonvolatile memory 56 into the system memory 52 and executes the loaded program. The shooting mode process in FIG. 3 is started when the digital camera 100 is started up in the shooting mode, and flags, control variables, and so forth are initialized.

Figure 4A:
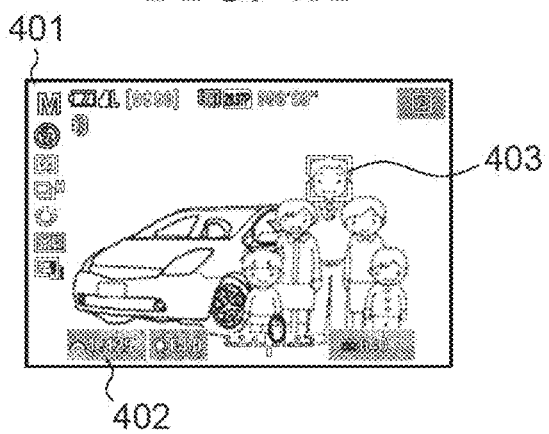
FIGS. 4A to 4F are views each showing an example of a shooting live view displayed on a display section.

Referring to FIG. 3, first, in a step S301, the system controller 50 displays a shooting live view 401 shown in FIG. 4A on the display section 28 based on signals detected by the image capturing section 22. Then, the shooting mode process proceeds to a step S302.

In the step S302, the system controller 50 displays shooting-related information 402 appearing in FIG. 4A on the shooting live view 401. The shooting-related information 402 includes an icon indicating a set status of various settings and shooting parameters, such as a shutter speed, of the digital camera 100. Further, on the shooting live view 401, a GUI item for showing a result of analysis of a live view image to a user, such as a subject detection frame 403 appearing in FIG. 4A, is displayed. When the step S302 is completed, the shooting mode process proceeds to a step S303.

Figure 5:
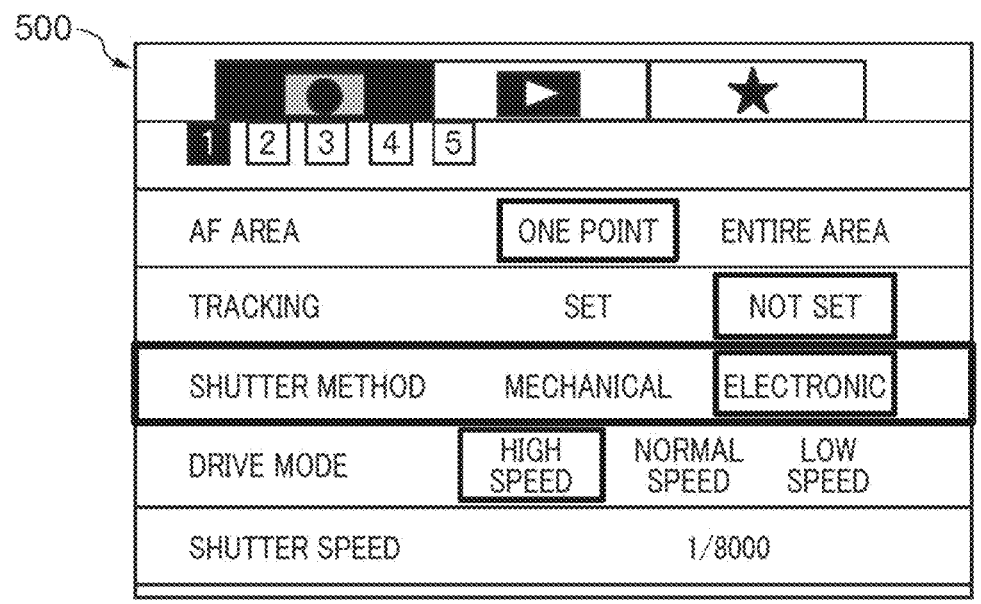
FIG. 5 is view showing an example of a menu setting screen displayed on the display section.

In the step S303, the system controller 50 determines whether or not the user has performed an operation for switching the AF area setting, on the operation section 70. For example, the user can perform an operation for switching the screen displayed on the display section 28 from the shooting live view 401 to a menu setting screen 500 shown in FIG. 5, and perform an operation for switching the AF area setting from the menu setting screen 500. On the menu setting screen 500, not only the AF area setting, but also a tracking setting, a shutter method setting, a drive mode setting, and a shutter speed setting can be switched. If the user has performed the operation for switching the AF area setting, the shooting mode process proceeds to a step S304. If the user has not performed the operation for switching the AF area setting, the shooting mode process proceeds to a step S305.

In the step S304, the system controller 50 changes the AF area setting according to the user's operation. More specifically, the system controller 50 changes the AF area setting to a setting selected by the user from "one point AF" and "entire area AF" displayed on the menu setting screen 500. Then, the shooting mode process proceeds to the step S305.

In the step S305, the system controller 50 determines whether or not the user has performed an operation for switching the tracking setting, on the operation section 70. If the user has performed the operation for switching the tracking setting, the shooting mode process proceeds to a step S306. If the user has not performed the operation for switching the tracking setting, the shooting mode process proceeds to a step S307.

In the step S306, the system controller 50 changes the tracking setting according to the user's operation. More specifically, the system controller 50 changes the tracking setting to a setting selected by the user from "set" and "not set" displayed on the menu setting screen 500. Then, the shooting mode process proceeds to the step S307.

In the step S307, the system controller 50 determines whether or not the user has performed an operation for switching the shutter method setting, on the operation section 70. If the user has performed the operation for switching the shutter method setting, the shooting mode process proceeds to a step S308. If the user has not performed the operation for switching the shutter method setting, the shooting mode process proceeds to a step S309.

In the step S308, the system controller 50 changes the shutter method setting according to the user's operation. More specifically, the system controller 50 changes the shutter method setting to a setting selected by the user from "mechanical shutter" and "electronic shutter" displayed on the menu setting screen 500. If the "mechanical shutter" is selected, the mechanical shutter method for controlling the shutter speed using a physical mechanism is set as the shutter method. If the "electronic shutter" is selected, the electronic shutter method for electronically controlling the image capturing device to adjust the shutter speed is set as the shutter method. Although in the present embodiment, the description is given of a case where the choices of the shutter method setting include the mechanical shutter method and the electronic shutter method, any other suitable method may be provided as a choice. For example, examples of the other choice of the shutter method include a method for performing electronically controlling only a front curtain (electronic front curtain). When the step S308 is completed, the shooting mode process proceeds to the step S309.

In the step S309, the system controller 50 determines whether or not the user has performed an operation for switching the drive mode setting, on the operation section 70. If the user has performed the operation for switching the drive mode setting, the shooting mode process proceeds to a step S310. If the user has not performed the operation for switching the drive mode setting, the shooting mode process proceeds to a step S311.

In the step S310, the system controller 50 changes the drive mode setting according to the user's operation. In the drive mode setting, a frame speed in continuous shooting is set. The frame speed is a parameter indicating the number of images shot per unit time in continuous shooting. The frame speed can also be referred to as the continuous shooting speed. In the step S310, more specifically, the system controller 50 changes the drive mode setting to a setting selected by the user from "high speed (30 frames/sec)", "normal (10 frames/sec)", and "low speed (3 frames/sec)" displayed on the menu setting screen 500. Then, the shooting mode process proceeds to the step S311.

In the step S311, the system controller 50 determines whether or not the user has performed an operation for switching the shutter speed setting, on the operation section 70. If the user has performed the operation for switching the shutter speed setting, the shooting mode process proceeds to a step S312. If the user has not performed the operation for switching the shutter speed setting, the shooting mode process proceeds to a step S313.

In the step S312, the system controller 50 changes the shutter speed setting according to the user's operation. More specifically, the system controller 50 changes the shutter speed setting to a setting selected by the user on the menu setting screen 500. Then, the shooting mode process proceeds to the step S313.

In the step S313, the system controller 50 performs a shooting process, described hereinafter with reference to FIG. 6. Then, in a step S314, the system controller 50 determines whether or not the user has performed any other operation on the operation section 70. The other operation refers to e.g. an operation for changing various parameters (such as an aperture value) associated with shooting. If the user has performed another operation, the shooting mode process proceeds to a step S315. If the user has performed no other operation, the shooting mode process proceeds to a step S316.

In the step S315, the system controller 50 performs other processing according to the user's operation. The other processing refers to e.g. processing for changing various parameters (such as the aperture value) associated with shooting. Then, in the step S316, the system controller 50 determines whether or not the user has performed a termination operation, on the operation section 70. If the user has not performed the termination operation, the shooting mode process returns to the step S302. If the user has performed the termination operation, the shooting mode process is terminated.

Incidentally, in shooting using the electronic shutter, there is no shutter sound generated by driving the mechanical shutter, and hence the user cannot always recognize the shooting timing. To cope with this problem, the digital camera 100 lights a GUI item for notifying a user of the shooting timing, such as a white frame item 405, described hereinafter with reference to FIG. 4C, on the display section 28 during an exposure processing execution period which is a time period over which exposure processing is performed. The user can recognize the timing of continuous shooting based on the display state of the white frame item 405 even when there is no shutter sound.

However, there is a case where even when the white frame item 405 is lighted on the display section 28, the user cannot recognize the shooting timing. For example, in a case where the shutter speed is high and the frame speed is low, the exposure processing execution period is reduced, and hence even when the white frame item 405 is lighted on during the exposure processing execution period, the lighting on time of the white frame item 405 is too short, so that there is a possibility that the user is incapable of recognizing the shooting timing. Further, in a case where the frame speed is high, an interval between one exposure processing execution period and the next exposure processing execution period is short, and hence there is a possibility that the user is incapable of recognizing a pause in the lighting of the white frame item 405.

To prevent this, in the present embodiment, a minimum lighting-on period over which a lighted on state (displayed state) of the white frame item 405 is continued is set. Here, the minimum lighting-on period is assumed to be 16 msec. In a case where continuous shooting is performed at a certain frame speed and a second shutter speed higher than a first shutter speed, the digital camera 100 continues to light on (display) the white frame item 405 for the minimum lighting-on period longer than an exposure processing executing period determined based on the second shutter speed.

Further, in the present embodiment, a minimum lighting-off period over which a lighted off state (non-displayed state) of the white frame item 405 is continued is set. Here, the minimum lighting-off period is assumed to be 30 msec. The minimum lighting-off period is longer than the minimum lighting-on period. In a case where continuous shooting is performed at a certain shutter speed and a second frame speed higher than a first frame speed, when the minimum lighting-off period elapses which is longer than a time period from an end of lighting on (displaying) of the white frame item 405 to a start of execution of the next exposure processing, which is determined based on the second frame speed, the digital camera 100 lights on again (displays again) the white frame item 405.

Figure 6A:
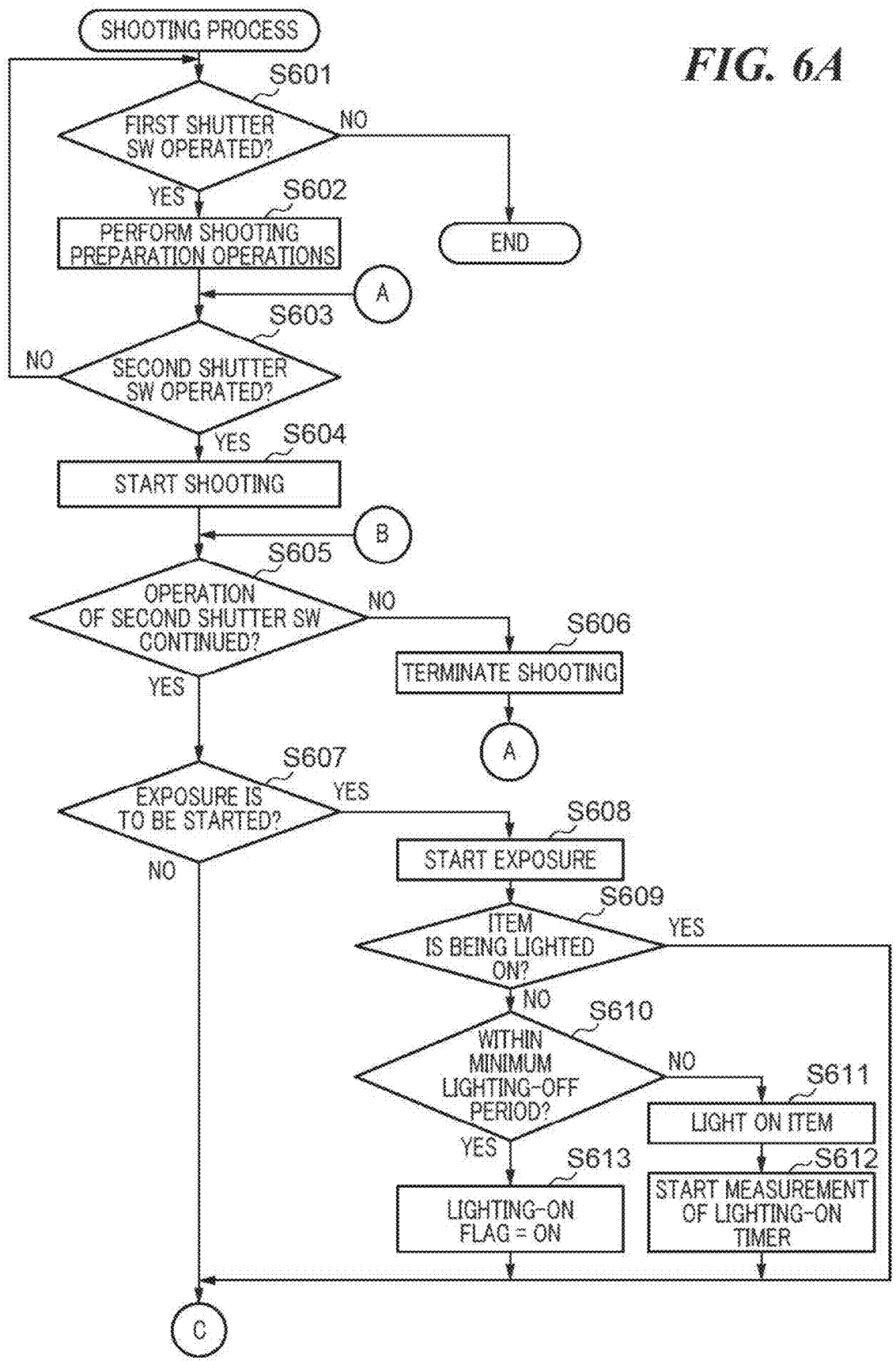
FIG. 6A is a flowchart of a shooting process.
Figure 6B:
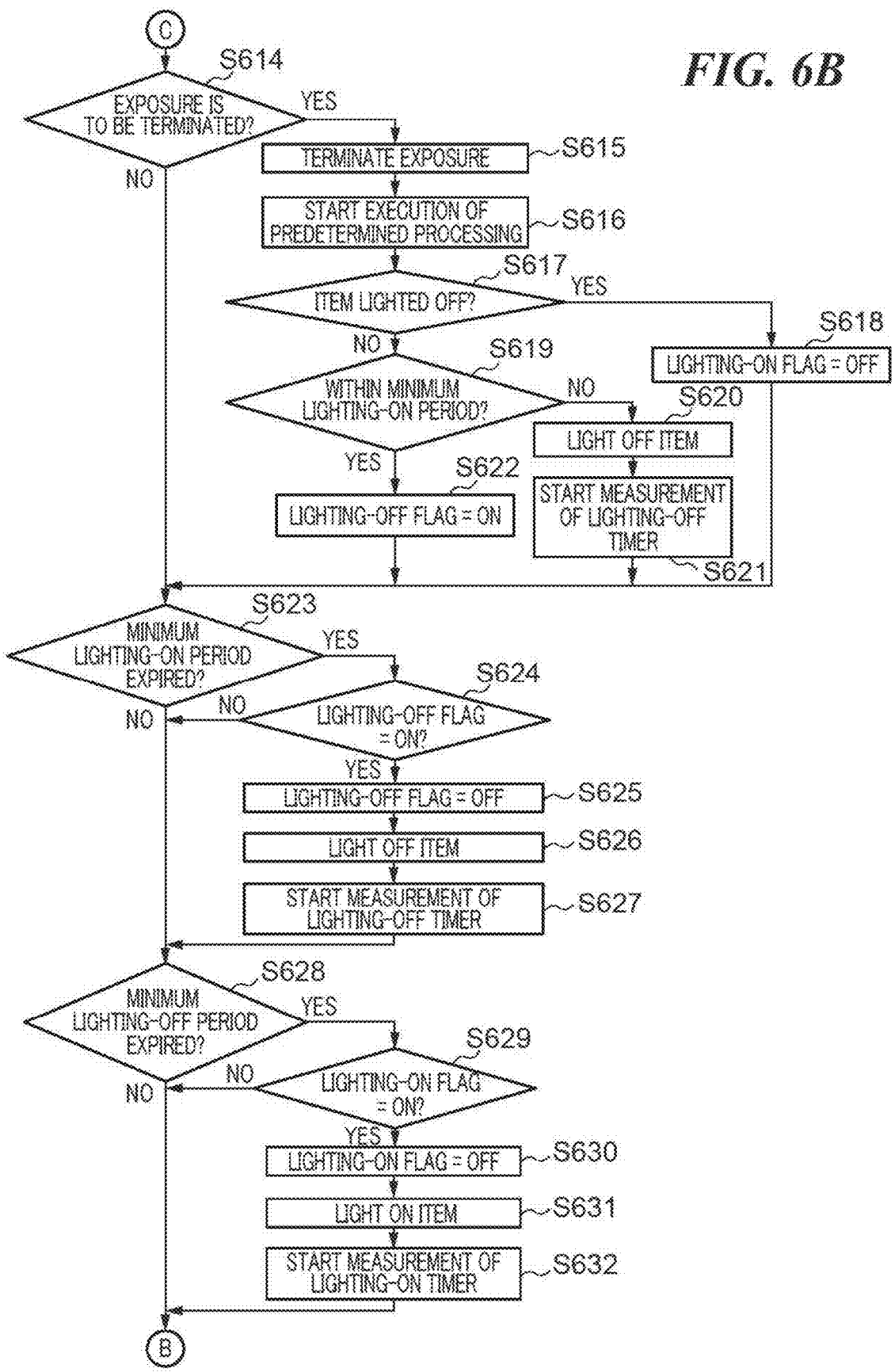
FIG. 6B is a continuation of FIG. 6A.

FIGS. 6A and 6B are a flowchart of the shooting process performed in the step S313 in FIG. 3.

Referring to FIG. 6A, in a step S601, the system controller 50 determines whether or not a user has operated the first shutter switch 62. If the user has operated the first shutter switch 62, the shooting process proceeds to a step S602. If the user has not operated the first shutter switch 62, the shooting process is terminated.

Figure 4B:
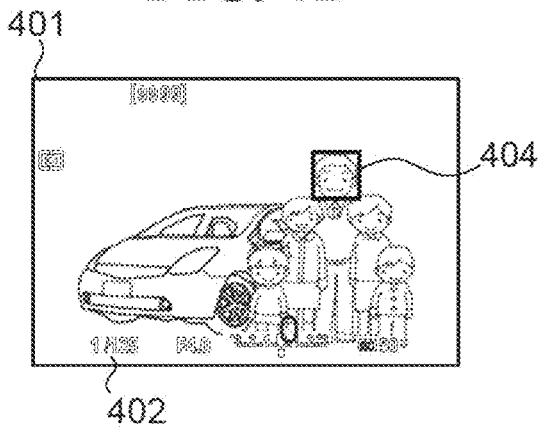

In the step S602, the system controller 50 performs shooting preparation operations, such as photometry and ranging. FIG. 4B shows an example of a screen displayed on the display section 28 when the shooting preparation operations are performed. On this screen, the shooting-related information 402 narrowed down to information necessary for the shooting preparation operations is displayed in a state superimposed on the shooting live view 401. Further, on this screen, not the subject detection frame 403, but an AF frame 404 indicating a photometry result is displayed in a state superimposed on the shooting live view 401. Then, the shooting process proceeds to a step S603.

In the step S603, the system controller 50 determines whether or not the user has operated the second shutter switch 64. If the user has not operated the second shutter switch 64, the shooting process returns to the step S601. If the user has operated the second shutter switch 64, the shooting process proceeds to a step S604.

In the step S604, the system controller 50 starts shooting. The following description will be given of a case where continuous shooting is performed. Then, in a step S605, the system controller 50 determines whether or not the operation of the second shutter switch 64 is being continued. If the operation of the second shutter switch 64 is being continued, the shooting process proceeds to a step S607. If the operation of the second shutter switch 64 is not being continued, the shooting process proceeds to a step S606.

In the step S606, the system controller 50 terminates the shooting (continuous shooting). Then, the shooting process returns to the step S603. At this time, a lighting-on flag and a lighting-off flag, described hereinafter, are all initialized.

In the step S607, the system controller 50 determines whether or not to start the exposure processing based on a shutter speed set on the menu setting screen 500. If it is determined in the step S607 that the exposure processing is not to be started, i.e. the exposure processing is being executed, the shooting process proceeds to a step S614 in FIG. 6B, described hereinafter. If it is determined in the step S607 that the exposure processing is to be started, the shooting process proceeds to a step S608.

In the step S608, the system controller 50 instructs the start of the exposure processing. With this, in the digital camera 100, the exposure processing is started. Then, the shooting process proceeds to a step S609. In the step S609, the system controller 50 determines whether or not the white frame item 405, described hereinafter, is being lighted on the shooting live view 401.

If it is determined in the step S609 that the white frame item 405 is being lighted on the shooting live view 401, the shooting process proceeds to the step S614 in FIG. 6B. If it is determined in the step S609 that the white frame item 405 is not being lighted on the shooting live view 401, the shooting process proceeds to a step S610. In the step S610, the system controller 50 determines whether or not it is during the minimum lighting-off period of the white frame item 405.

If it is determined in the step S610 that it is not during the minimum lighting-off period of the white frame item 405, the shooting process proceeds to a step S611.

Figure 4C:
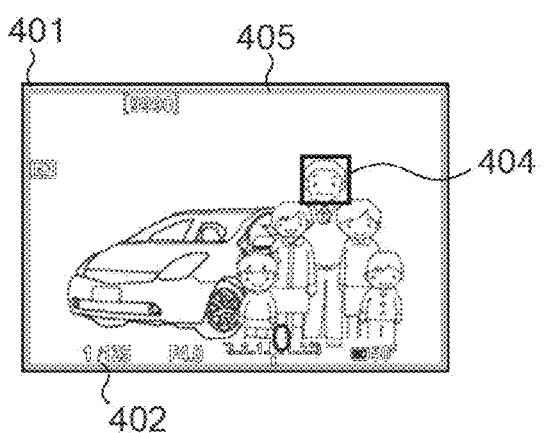

In the step S611, the system controller 50 displays the live view image and the white frame item 405 together on the shooting live view 401 as shown in FIG. 4C. FIG. 4C shows an example of a screen displayed on the display section 28 when the exposure processing is executed in continuous shooting. On this screen, the shooting-related information 402 narrowed down to the information necessary for shooting, the AF frame 404 indicating a photometry result, and the white frame item 405 indicating that the exposure processing is being executed are displayed in a state superimposed on the shooting live view 401.

The white frame item 405 is displayed such that the white frame item 405 surrounds an outer periphery of the live view screen. This enables a user to easily confirm a state of a subject displayed on the shooting live view 401. Further, it is possible to obtain an effect of giving a warning against handshake to a user while the white frame item 405 is being displayed. Further, since the white color, which is bright and noticeable, is employed for the frame color of the white frame item 405, it is possible to enable the user to easily recognize the white frame item 405 at a peripheral end of sight of the user even though the white frame item 405 is at the outer periphery of the live view screen.

Note that the form of the white frame item 405 is not limited to this, but for example, another noticeable color different from white may be employed for the frame color. Further, the form of the white frame item 405 may be dynamically changed according to a state of the camera. For example, in a case where a user's line of sight is directed toward the vicinity of the outer periphery of the screen, the transmittance of the white frame item 405 in the vicinity of the outer periphery of the screen may be controlled to be reduced to thereby enable the user to more easily confirm a state of a subject displayed on the shooting live view 401. Then, in a step S612, the system controller 50 starts measurement of a lighting-on timer for determining expiration of the minimum lighting-on period of the white frame item 405, and the shooting process proceeds to the step S614.

If it is determined in the step S610 that it is during the minimum lighting-off period of the white frame item 405, the shooting process proceeds to a step S613. In the step S613, the system controller 50 sets the lighting-on flag for controlling causing the white frame item 405 to be lighted on in a state in which the white frame item 405 remains lighted off on the shooting live view 401. That is, even when the exposure processing is started, if it is during the minimum lighting-off period of the white frame item 405, the lighted off state of the white frame item 405 is continued. In other words, even when the exposure processing for the next shooting is started before the minimum lighting-off period elapses after completion of display of the item associated with the preceding shooting, the system controller 50 controls the display not to start the display of the item. Then, the shooting process proceeds to the step S614 in FIG. 6B.

In the step S614, the system controller 50 determines, based on the shutter speed set on the menu setting screen 500, whether or not to terminate the exposure processing.

If it is determined in the step S614 that the exposure processing is not to be terminated, the shooting process proceeds to a step S623. If it is determined in the step S614 that the exposure processing is to be terminated, the shooting process proceeds to a step S615. In the step S615, the system controller 50 instructs termination of the exposure processing. The digital camera 100 terminates the exposure processing in response to this instruction. Then, in a step S616, the system controller 50 starts execution of predetermined processing. The predetermined processing includes processing performed in a time period from an end of one exposure processing operation to a start of the next exposure processing operation, such as processing for developing an image read from the sensor and processing for writing the image subjected to the developing processing into a recording medium. Then, the shooting process proceeds to a step S617. In the step S617, the system controller 50 determines whether or not the white frame item 405 is lighted off on the shooting live view 401.

If it is determined in the step S617 that the white frame item 405 is lighted off, the shooting process proceeds to a step S618. In the step S618, the system controller 50 sets the lighting-on flag to off. Then, the shooting process proceeds to the step S623.

If it is determined in the step S617 that the white frame item 405 is not lighted off, the shooting process proceeds to a step S619. In the step S619, the system controller 50 determines whether or not it is during the minimum lighting-on period of the white frame item 405.

Figure 4D:
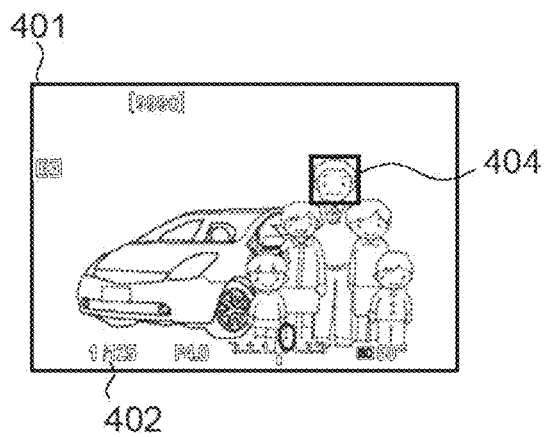

If it is determined in the step S619 that it is not during the minimum lighting-on period of the white frame item 405, the shooting process proceeds to a step S620. In the step S620, the system controller 50 causes the white frame item 405 to be lighted on the shooting live view 401 as shown in FIG. 4D. In a case where the display of the white frame item 405 is started when the exposure processing is started, a time period from the start of exposure to the end of exposure is the display period of the white frame item 405.

FIG. 4D shows an example of a screen displayed on the display section 28 after one exposure processing operation is terminated until the next exposure processing operation is started in the continuous shooting. On this screen, the shooting-related information 402 narrowed down to the information necessary for shooting, and the AF frame 404 indicating a photometry result are displayed in a state superimposed on the shooting live view 401, but the white frame item 405 is not displayed. Then, the shooting process proceeds to a step S621. In the step S621, the system controller 50 starts measurement of a lighting-off timer for determining expiration of the minimum lighting-off period of the white frame item 405. Also, the system controller 50 stops measurement of the lighting-on timer. Then, the shooting process proceeds to the step S623.

If it is determined in the step S619 that it is during the minimum lighting-on period of the white frame item 405, the shooting process proceeds to a step S622. In the step S622, the system controller 50 sets the lighting-off flag for controlling causing the white frame item 405 to be lighted off to on while causing the white frame item 405 to remain lighted on the shooting live view 401. That is, in the present embodiment, even when the exposure processing is terminated, the lighted on state of the white frame item 405 is continued if it is during the minimum lighting-on period of the white frame item 405. In other words, in a case where the exposure time from the start to the end of exposure is shorter than the minimum lighting-on period, the system controller 50 continues to display the white frame item even after the exposure time has elapsed. That is, the system controller 50 continues to display the white frame item during the minimum lighting-on period regardless of the exposure time.

Then, the shooting process proceeds to the step S623. In the step S623, the system controller 50 determines, based on a result of the measurement performed by the lighting-on timer, whether or not the minimum lighting-on period has expired.

If it is determined in the step S623 that the minimum lighting-on period has expired, the shooting process proceeds to a step S624. In the step S624, the system controller 50 determines whether or not the lighting-off flag is on.

If it is determined in the step S624 that the lighting-off flag is on, the shooting process proceeds to a step S625. In the step S625, the system controller 50 sets the lighting-off flag to off. Then, in a step S626, the system controller 50 causes the white frame item 405 to be lighted off. Then, in a step S627, the system controller 50 starts measurement of the lighting-off timer. Also, the system controller 50 stops measurement of the lighting-on timer, if the system controller 50 makes measurement of the lighting-on timer. Then, the shooting process proceeds to a step S628.

Also, it is determined in the step S623 that the minimum lighting-on period has not expired or if it is determined in the step S624 that the lighting-off flag is not on, the shooting process proceeds to the step S628. In the step S628, the system controller 50 determines, based on a result of the measurement performed by the lighting-off timer, whether or not the minimum lighting-off period has expired.

If it is determined in the step S628 that the minimum lighting-off period has expired, the shooting process proceeds to a step S629. In the step S629, the system controller 50 determines whether or not the lighting flag is on.

If it is determined in the step S629 that the lighting-on flag is on, the shooting process proceeds to a step S630. In the step S630, the system controller 50 sets the lighting-on flag to off. Then, in a step S631, the system controller 50 lights on the white frame item 405. Then, in a step S632, the system controller 50 starts measurement of the lighting-on timer and stops measurement of the lighting-off timer. Then, the shooting process returns to the step S605.

If it is determined in the step S628 that the minimum lighting-off period has not expired, or if it is determined in the step S629 that the lighting-on flag is not set to on, the shooting process returns to the step S605 in FIG. 6A.

Note that although in the above-described shooting process in FIGS. 6A and 6B, if it is determined in the step S605 that the operation of the second shutter switch 64 has been terminated in continuous shooting, the shooting termination processing in the step S606 is immediately executed, but this is not limitative. For example, the shooting termination processing may be executed after completion of processing being executed, or the shooting process may be continued until the minimum lighting-on period or the minimum lighting-off period of the white frame item 405 expires.

Further, in the above-described shooting process in FIGS. 6A and 6B, the minimum lighting-off period of the white frame item 405 is longer than the minimum lighting-on period. In order for a user to recognize that a bright color, such as white, is lighted off, it is necessary to continue the lighted off state for a relatively long time period. By setting the minimum lighting-off period of the white frame item 405 to be longer than the minimum lighting-on period of the same, it is possible to realize natural blinking which the user can recognize.

FIGS. 7A to 7E are diagrams useful in explaining states of the white frame item 405 lighted on and lighted off by the shooting process in FIGS. 6A and 6B for each combination of a shutter speed and a frame speed.

Figure 7A:
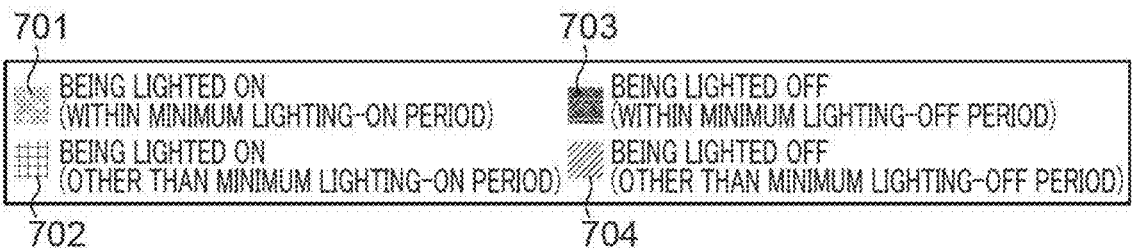
FIGS. 7A to 7E are diagrams useful in explaining states of a white frame item which is lighted-on and lighted-off by the shooting process.

FIG. 7A shows an explanatory note used for explaining FIGS. 7B to 7E. Referring to FIG. 7A, reference numeral 701 denotes a time period within the minimum lighting-on period, during which the white frame item 405 is lighted on. Reference numeral 702 denotes a time period other than the minimum lighting-on period, during which the white frame item 405 is lighted on. Reference numeral 703 denotes a time period within the minimum lighting-off period, during which the white frame item 405 is lighted off. Reference numeral 704 denotes a time period other than the minimum lighting-off period, during which the white frame item 405 is lighted off.

FIGS. 7B to 7E show the lighted on and lighted off states of the white frame item 405 associated with changes in a waveform 712 representing the exposure processing execution period based on parameter settings 711 including the shutter speed setting and the frame speed setting. In the waveform 712, a period of 1 indicates the exposure processing execution period, and a period of 0 indicates a period from completion of one exposure processing operation to the start of the next exposure processing operation (hereinafter referred to as the "exposure processing non-execution period"). In the period of 0, the exposure processing is not executed, but processing other than the exposure processing is executed.

Figure 7B:
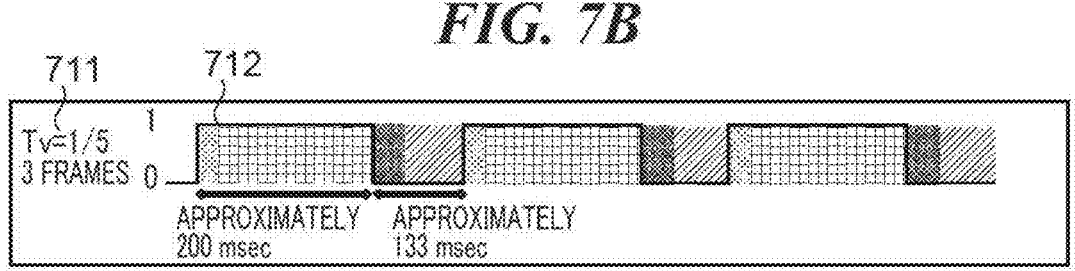

FIG. 7B shows an example of a case where the shutter speed is relatively low and the frame speed is relatively low. In the digital camera 100, as the shutter speed is lower, the exposure processing execution period is longer. For this reason, in a case where the shutter speed is relatively low, as shown in FIG. 7B, the white frame item 405 is lighted on during each period of 1 in the waveform 712 i.e. during the exposure processing execution period, whereby the user can easily recognize the lighted on state of the white frame item 405. On the other hand, in the digital camera 100, as the frame speed is lower, time to elapse until the start of execution of the next exposure processing is longer. For this reason, in a case where the frame speed is relatively low, as shown in FIG. 7B, the white frame item 405 is lighted off during each period of 0 in the waveform 712, i.e. during the exposure processing non-execution period, whereby the user can easily recognize the lighted off state of the white frame item 405.

Figure 7C:
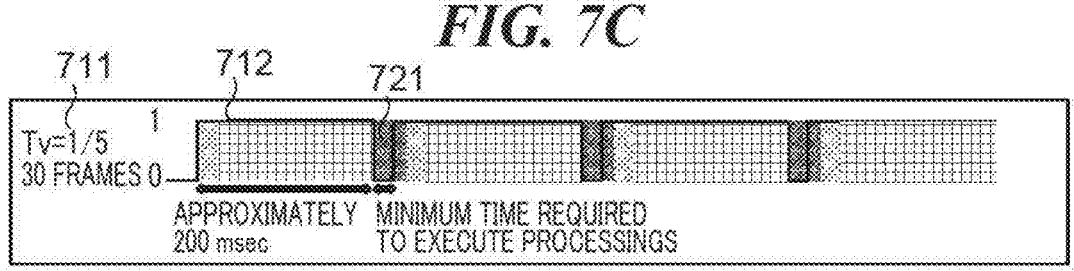

FIG. 7C shows an example of a case where the shutter speed is relatively low and the frame speed is relatively high. In the digital camera 100, in a case where the shutter speed is relatively low, as shown in FIG. 7B described above, the white frame item 405 is lighted on during the exposure processing execution period, whereby the user can easily recognize the lighted on state of the white frame item 405. On the other hand, in the digital camera 100, as the frame speed is higher, time to elapse until the start of execution of the next exposure processing is shorter. For this reason, if the white frame item 405 is only lighted off during the exposure processing non-execution period as described above with reference to FIG. 7B, an interval between one exposure processing execution period and the next exposure processing execution period is so short that it is difficult for the user to recognize a pause in the lighting of the white frame item 405. To cope with this, in the present embodiment, a minimum lighting-off period 721 is provided, and the lighted off state of the white frame item 405 is continued at least during the minimum lighting-off period 721. This makes it possible to sufficiently secure the lighting off time of the white frame item 405 indicating the timing of continuous shooting, and enable the user to easily recognize a pause in the lighting of the white frame item 405. As a result, the user can easily recognize the timing of continuous shooting.

Figure 7D:
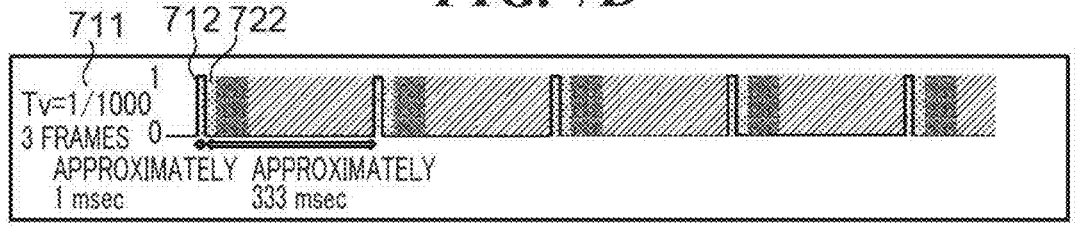

FIG. 7D shows an example of a case where the shutter speed is relatively high and the frame speed is relatively low. In the digital camera 100, as the shutter speed is higher, the exposure processing execution period is shorter. For this reason, if the white frame item 405 is only lighted on during the exposure processing execution period as shown in FIGS. 7B and 7C, the lighting on time of the white frame item 405 is so short that it is difficult for the user to recognize the lighting of the white frame item 405. To cope with this, in the present embodiment, a minimum lighting-on period 722 is provided, and the lighted on state of the white frame item 405 is continued at least during the minimum lighting-on period 722. This makes it possible to sufficiently secure the lighting on time of the white frame item 405 indicating the timing of continuous shooting, and enable the user to easily recognize the lighting of the white frame item 405. As a result, the user can easily recognize the timing of continuous shooting. On the other hand, in a case where the frame speed is relatively low, by lighting off the white frame item 405 during the exposure processing non-execution period as described above with reference to e.g. FIG. 7B, the user can easily recognize the lighting off of the white frame item 405.

Figure 7E:
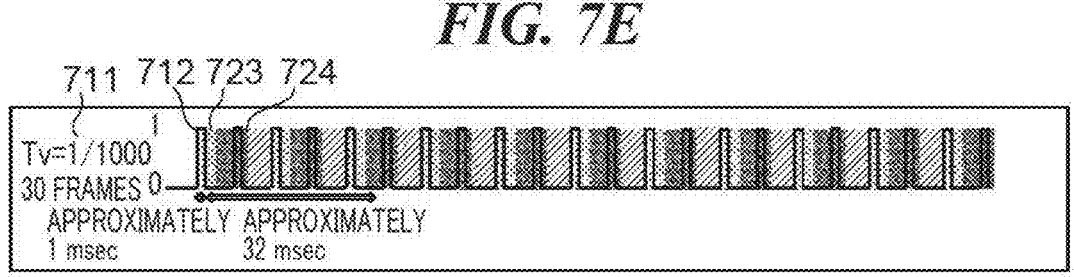

FIG. 7E shows an example of a case where the shutter speed is relatively high and the frame speed is also relatively high. In this example, as described above, the lighted on state of the white frame item 405 is continued at least during a minimum lighting-on period 723, and hence it is possible to enable the user to easily recognize the lighting of the white frame item 405. Further, as described above, the lighted off state of the white frame item 405 is continued at least during a minimum lighting-off period 724. With this, it is possible to enable the user to easily recognize a pause in the lighting of the white frame item 405. Note that in FIG. 7E, the number of times of blinking of the white frame item 405 does not necessarily coincide with the number of actual shooting times (number of frames). Here, in the case where the shutter speed is relatively high and the frame speed is also relatively high, even when the white frame item 405 is lighted on and lighted off the number of times corresponding to the number of actual shooting times, blinking of the white frame item 405 is so fast that it is difficult for the user to grasp the number of actual shooting times from the number of blinking times of the white frame item 405. In this case, it is enough for the user to be notified of execution of high-speed continuous shooting rather than to be notified of the exact number of shooting times. On the other hand, in the present embodiment, blinking (lighting on and lighting off) of the white frame item 405 is performed at intervals roughly equivalent to those of high-speed continuous shooting, based on the minimum lighting-on period and the minimum lighting-off period. With this, it is possible to notify the user that high-speed continuous shooting is being performed in a case where the shutter speed is relatively high and the frame speed is also relatively high.

The present invention has been described heretofore based on the above-described embodiment, but the present invention is not limited to the above-described embodiment. For example, a mechanism for generating an electronic shutter sound may be provided to notify a user of the shooting timing using the electronic shutter sound. Note that the electronic shutter sound is generated strictly in synchronism with the shooting timing, but blinking of the white frame item 405 is not necessarily required to coincide with the shooting timing as shown in FIG. 7E.

Further, in the above-described embodiment, the display of the white frame item 405 may be performed only in shooting using an electronic shutter. Here, when shooting using a mechanical shutter is performed, the shooting timing and the exposure processing execution period can be notified by a shutter sound of the mechanical shutter, and hence the display of the white frame item 405 surrounding the shooting live view 401 is not required. Therefore, by limiting the display of the white frame item 405 to the case of shooting using an electronic shutter, it is possible, at the time of shooting using a mechanical shutter, to enable a user to easily confirm the shooting live view 401 during shooting using the mechanical shutter.

Although in the above-described embodiment, the white frame item 405 is lighted on during the exposure processing execution period, and lighted off during the exposure processing non-execution period, this is not limitative. For example, the white frame item 405 may be lighted off during the exposure processing execution period, and lighted on during the exposure processing non-execution period.

Figure 4E:
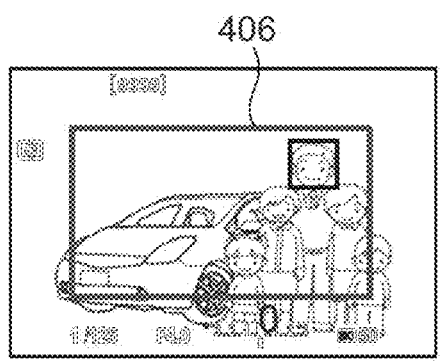

In the above-described embodiment, the GUI item for notifying a user of the shooting timing is not limited to a white frame displayed on the outer periphery of the screen, such as the white frame item 405. For example, as the GUI item for notifying a user of the shooting timing, a frame 406 of an unnoticeable color, such as gray, may be displayed in the vicinity of the center of the screen, as shown in FIG. 4E.

Figure 4F:
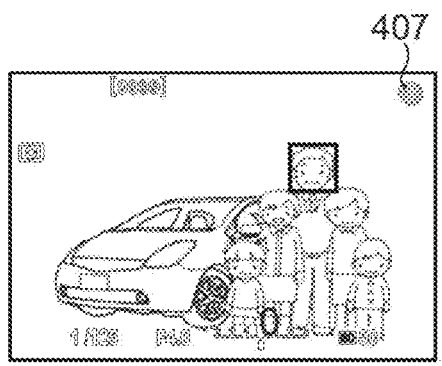

Further, in the above-described embodiment, as the GUI item for notifying a user of the shooting timing, an icon 407 appearing in FIG. 4F may be displayed in a blinking state.

Although in the above-described embodiment, the configuration of displaying the white frame item 405 on the display section 28 is described, this is not limitative. For example, the white frame item 405 may be displayed on one of the display section 28 and the EVF 29, as a unit whose display is set to on i.e. on which the shooting live view 401 is displayed.

Further, in the above-described embodiment, the display form of the white frame item 405 may be varied between the display section 28 and the EVF 29.

Although in the above-described embodiment, one shooting period is divided into the exposure processing execution period and the exposure processing non-execution period, this is not limitative. For example, when continuous shooting is performed in a mode (SERVO AF) in which the focus is automatically and continuously adjusted, a GUI item for notifying a user of the shooting timing may be lighted on during the SERVO driving and lighted off in a time period in which focusing is achieved and the SERVO driving is temporarily stopped.

In the above-described embodiment, the display of the white frame item 405 may be performed such that, in continuous shooting, the white frame item 405 is not displayed at a first shooting timing and is displayed at second and subsequent shooting timings.

Note that the above-described various controls described as performed by the CPU may be performed by one hardware item or by a plurality of hardware items that share the processing operations, for control of the whole apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-209347, filed Dec. 17, 2020, which is hereby incorporated by reference herein in its entirety.

What is claimed is:

1. An electronic apparatus, comprising:
a memory and at least one processor which function as:
a setting unit configured to set an exposure time;
a control unit configured to, during continuous shooting at the exposure time set by the setting unit, control to
display an item indicating a timing of execution of shooting together with a live view image, for a display time period associated with the exposure time, and
not display the item for a non-display time period from an end of the display time period until a start of next display time period,
wherein the control unit
in a case where a length of the exposure time set by the setting unit is a predetermined threshold value or more, sets a length of the display time period to a length corresponding to the exposure time, and
in a case where the length of the exposure time set by the setting unit is shorter than the predetermined threshold value, sets the length of the display time period to a predetermined length which does not depend on the exposure time.

2. The electronic apparatus according to claim 1, wherein the item is a frame that surrounds an outer periphery of the live view image.

3. The electronic apparatus according to claim 1, wherein the item is displayed on an edge area of a display screen within which the live view image is displayed.

4. The electronic apparatus according to claim 1, wherein in the case where the length of the exposure time set by the setting unit is a predetermined threshold value or more, the length of the display time period is the exposure time.

5. The electronic apparatus according to claim 1, wherein the predetermined threshold value is equal to the predetermined length.

6. The electronic apparatus according to claim 1, wherein the setting unit sets a shutter speed in accordance with a user operation.

7. The electronic apparatus according to claim 6, wherein the setting unit further sets a continuous shooting speed in accordance with a user operation, and
the control unit controls a display of the item in accordance with the shutter speed and the continuous shooting speed which are set by the setting unit.

8. The electronic apparatus according to claim 1, wherein the control unit controls the display of the item so that the length of the display time period during which the item is displayed is the predetermined length or more and the non-display time period during which the item is not displayed is a second predetermined length or more.

9. The electronic apparatus according to claim 1, wherein the control unit controls to set the display time period to be shorter in length than the exposure time so that the non-display time period is equal to the second predetermined length, in a case where a period from an exposure time of a single shooting until next exposure time during the continuous shooting is shorter than the second predetermined length even if the length of the exposure time set by the setting unit is the predetermined threshold value or more.

10. The electronic apparatus according to claim 8, wherein even if after an end of the display time period of the item regarding a single shooting and before an end of the non-display time period during the continuous shooting, a next-shooting next to the single shooting starts, the control unit controls not to start displaying the item regarding the said next-shooting.

11. A method of controlling an electronic apparatus comprising:
   setting an exposure time;
   during continuous shooting at the exposure time set by the setting step, controlling to
      display an item indicating a timing of execution of shooting together with a live view image, for a display time period associated with the exposure time, and
      not display the item for a non-display time period from an end of the display time period until a start of next display time period,
   wherein the controlling further comprises:
      in a case where a length of the exposure time set by the setting step is a predetermined threshold value or more, setting a length of the display time period to a length corresponding to the exposure time, and
      in a case where the length of the exposure time set by the setting step is shorter than the predetermined threshold value, setting the length of the display time period to a predetermined length which does not depend on the exposure time.

12. A non-transitory computer-readable storage medium storing a program that, when executed by a processor, cause the processor to perform operations comprising:
   setting an exposure time;
   during continuous shooting at the exposure time set by the setting step, controlling to
      display an item indicating a timing of execution of shooting together with a live view image, for a display time period associated with the exposure time, and
      not display the item for a non-display time period from an end of the display time period until a start of next display time period,
   wherein the controlling further comprises:
      in a case where a length of the exposure time set by the setting step is a predetermined threshold value or more, setting a length of the display time period to a length corresponding to the exposure time, and
      in a case where the length of the exposure time set by the setting step is shorter than the predetermined threshold value, setting the length of the display time period to a predetermined length which does not depend on the exposure time.

13. An electronic apparatus, comprising:
   a memory and at least one processor which function as:
   a first setting unit configured to set a shutter speed;
   a second setting unit configured to set a continuous shooting speed;
   a control unit configured to, during continuous shooting, control
      so as to display, on a display, an item indicating a timing of execution of shooting together with an image, for a display time period associated with the exposure time which is set based on the shutter speed set by the first setting unit, and
      so as not to display the item for a non-display time period from an end of the display time period until a start of next display time period,
   wherein the control unit, in a case where a length of the exposure time is shorter than a predetermined threshold value, controls so that a display time period of the item is a first length which is independent from the exposure time,
   wherein the control unit, in a case where a high shutter speed is set by the first setting unit and a high continuous shooting speed is set by the second setting unit, controls so as to display the item for a number of times less than a number of shooting times in a continuous shooting.

14. The electronic apparatus according to claim 13, wherein the control unit controls the display of the item so that the length of the display time period is the first length or more and that the length of the non-display time period is a second length or more.

15. The electronic apparatus according to claim 14, wherein the control unit controls, in a case where the high shutter speed is set by the first setting unit and the high continuous shooting speed is set by the second setting unit, to display the item using the display time period based on the first length and the non-display time period based on the second length.

16. The electronic apparatus according to claim 13, wherein the control unit controls to display the item on an edge area of the display.

17. The electronic apparatus according to claim 13, wherein the item is a frame that surrounds an outer periphery of the live view image displayed as the image.

18. The electronic apparatus according to claim 13, wherein the predetermined threshold value is the first length.

19. The electronic apparatus according to claim 13, wherein the high shutter speed is equal to or higher than a shutter speed of 1/1000 seconds.

20. The electronic apparatus according to claim 13, wherein
   the continuous shooting speed is a frame speed, and
   the high continuous shooting speed is larger than 10 frames/sec.

21. A method of controlling an electronic apparatus comprising:
   a first setting step of setting a shutter speed;
   a second setting step of setting a continuous shooting speed;
   during continuous shooting, controlling
      so as to display, on a display, an item indicating a timing of execution of shooting together with an image, for a display time period associated with an exposure time which is set based on the shutter speed set in the first setting step, and
      so as not to display the item for a non-display time period from an end of the display time period until a start of next display time period,
   wherein the controlling further comprises:
      in a case where a length of the exposure time is shorter than a predetermined threshold value, controlling so that a display time period of the item is a first length which is independent from the exposure time,
      in a case where a high shutter speed is set by the first setting step and a high continuous shooting speed is set by the second setting step, controlling so as to display the item for a number of times less than a number of shooting times in a continuous shooting.

22. A non-transitory computer-readable storage medium storing a program that, when executed by a processor, cause the processor to perform operations comprising:
a first setting step of setting a shutter speed;
a second setting step of setting a continuous shooting speed;
during continuous shooting, controlling
so as to display, on a display, an item indicating a timing of execution of shooting together with an image, for a display time period associated with an exposure time which is set based on the shutter speed set in the first setting step, and
so as not to display the item for a non-display time period from an end of the display time period until a start of next display time period,
wherein the controlling further comprises:
in a case where a length of the exposure time is shorter than a predetermined threshold value, controlling so that a display time period of the item is a first length which is independent from the exposure time,
in a case where a high shutter speed is set by the first setting step and a high continuous shooting speed is set by the second setting step, controlling so as to display the item for a number of times less than a number of shooting times in a continuous shooting.

* * * * *